Nov. 8, 1932.                S. WELLS                  1,887,174
                       CREAM SEPARATOR WASHER
                      Filed April 4, 1932        2 Sheets-Sheet 1
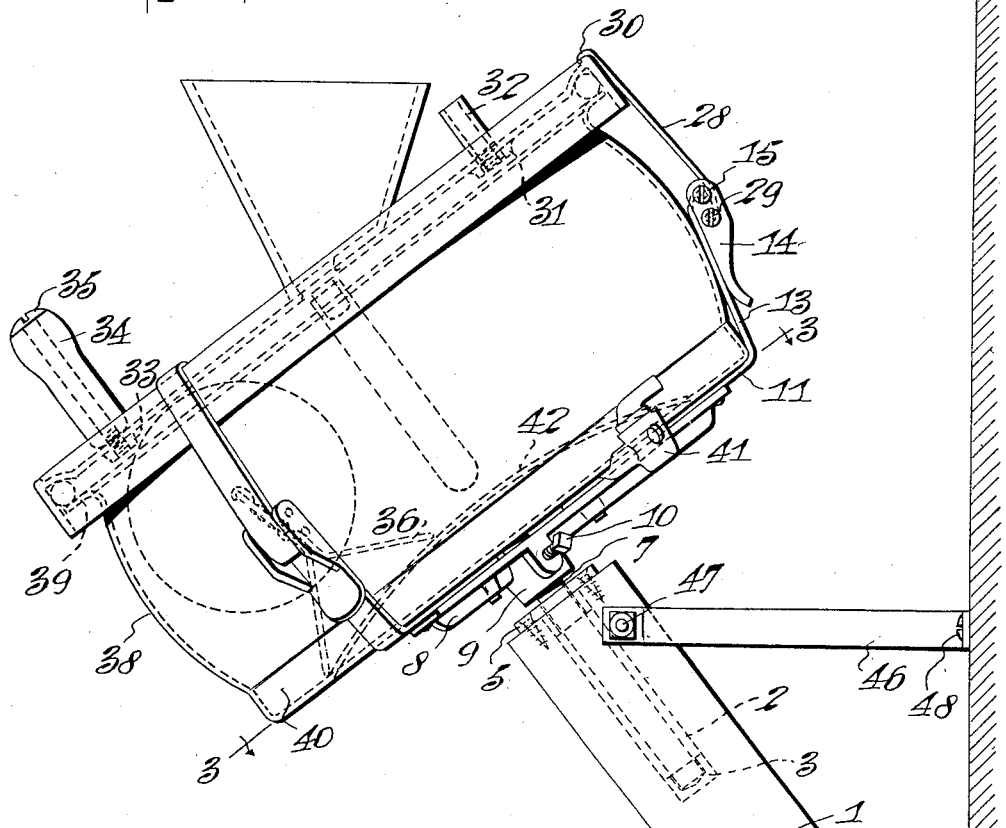
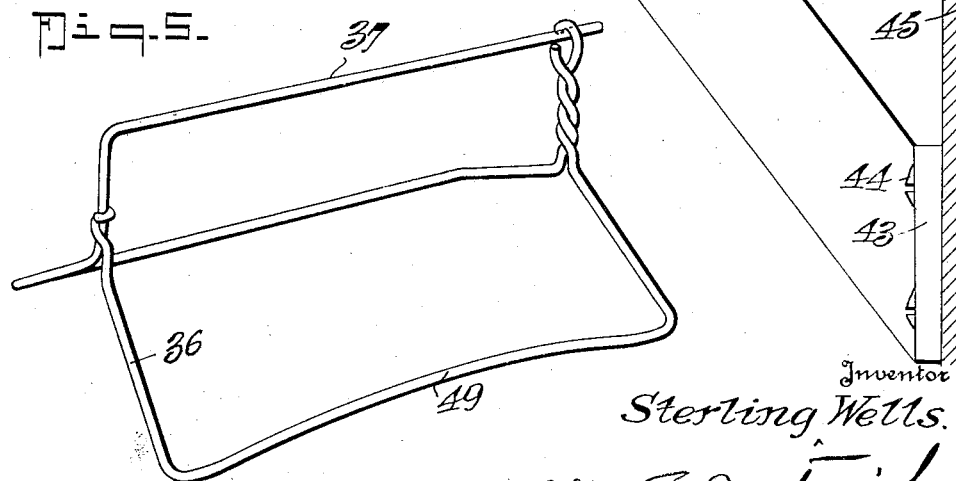
Inventor
Sterling Wells.
By Albert E. Dietrich
Attorney Nov. 8, 1932.  S. WELLS  1,887,174
CREAM SEPARATOR WASHER
Filed April 4, 1932  2 Sheets-Sheet 2
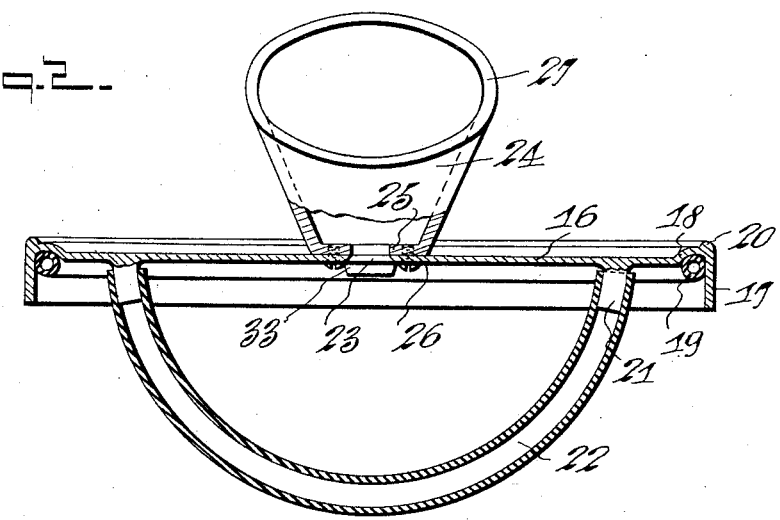
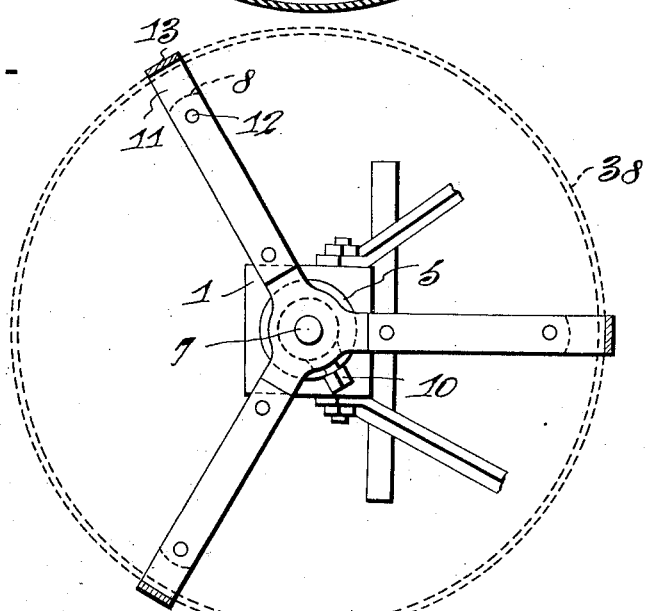
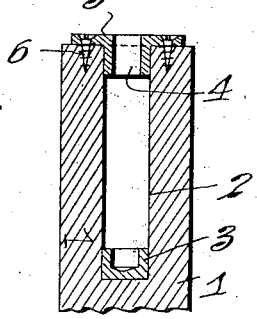
Inventor
Sterling Wells.
By Albert E Dietrich
Attorney Patented Nov. 8, 1932

1,887,174

UNITED STATES PATENT OFFICE

STERLING WELLS, OF SCHALLER, IOWA

CREAM SEPARATOR WASHER

Application filed April 4, 1932. Serial No. 603,153.

My invention relates to apparatus for washing the various washable parts of cream separators and it primarily has for its object to provide certain elements which enable me to make use of the ordinary large milk bowl of the separator as the wash bowl, thus making it necessary for the dairymen to purchase only these attachments or elements which consequently keeps down the expense. In other words, my invention provides certain parts which, when used in combination with the ordinary large milk bowls of cream separators, comprise a separator parts washing machine.

Generally speaking, my invention comprises a suitable support and means to mount it at an angle of substantially fifty degrees to the horizontal, a rotatable shaft mounted in bearings in the support and carrying a bowl supporting spider with quick attachable clamps, and a lid for the bowl of a peculiar structure which embodies a filling funnel delivering through the center of the lid, a vent through the lid adjacent the high end and short side of the funnel, a handle extending from the plane of the lid, and a flexible U-shaped member on the under side of the lid for projecting into the bowl and lying in a plane at right angles to that of the lid to serve to insure that the solid contents of the bowl will move with the bowl when the lid and bowl are rotated together.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of my invention with a separator bowl in place.

Figure 2 is a vertical longitudinal section of the lid.

Figure 3 is a cross section on the line 3—3 of Figure 1.

Figure 4 is an enlarged detail longitudinal section of the support end which carries the shaft bearings.

Figure 5 is a perspective view of the wire trestle on which the separator disks are strung (there are from twenty to thirty-seven disks in each separator depending upon the make of the separator).

In the drawings in which like numerals of reference indicate like parts in all of the figures, 1 represents the support which has a socket 2 in which is located a lower thrust bearing 3 and an upper sleeve bearing 4, the latter having a flange 5 secured to the support 1 at its upper end by screws 6. A shaft 7 is journalled in these bearings and is secured in the hub 9 of a spider 8 by a set screw 10.

The spider comprises a plurality of radial arms (preferably three) numbered 8 in the drawings, and to these arms are secured the lower clamping straps 11, the straps being secured by rivets 12 or in any other suitable way and having portions 13 which lie against the side of the bowl 38 and are pivotally connected at 15 to the channelled toggle levers 14 to which are also pivotally connected at 29 the cap holding straps 28 later again referred to.

The cover 16 is formed with a flange 17 to fit down over the mouth flange 39 of the bowl 38 of the separator and the cover is also provided with a groove 18 to receive the rubber ring-gasket 19 that effects a tight seal between the cover and the flange 39 when the parts are in their cooperative relationship. The cover 16 has a bead 20 over which the hooks 30 of the straps 28 engage so that when the toggle levers 14 are pushed down in the position indicated in Figure 1 the cover will be held tightly in place on the bowl 38 which will in turn be tightly held on the spider 8.

Centrally the cover is apertured as at 23 and over this aperture is fitted a funnel 24 having a flange 25 secured to the cover 16 by screws 26, or in any other suitable way. The funnel is so mounted that its axis, when the parts are in the position shown in Figure 1, will be vertical and its mouth edge 27 will be held at an angle of substantially forty degrees to the face of the cover.

31 is an apertured boss that is bored and tapped to receive the vent tube 32 which is located close to the funnel adjacent its short side, and 33 is another boss diametrically opposite to the boss 31 but adjacent the periphery of the cover. The boss 33 is also bored and tapped to receive the screw 35 that holds the handle 34 in place.

The bottom part of the bowl is formed with a ring-like part 40 as an extension of the side wall while the bottom proper is inwardly crowned as at 42. The bowl 38 is provided with the usual faucet 41. All parts of the bowl consisting of the elements 38, 39, 40, 41 and 42 are of the ordinary cream separator bowl construction and per se are not of my invention.

In order to hold the support 1 on the side of a building 45 or other suitable vertical wall or post, I provide the support 1 with a foot 43 and screw it to the wall 45 as at 44. Side braces 46 are also provided and are connected to the support 1 by a cross bolt 47 and to the building 45 by screws 48.

Experience has shown that a large number of people refuse to buy a cream separator or to use one because of the time it takes per day and the disagreeable nature of the job of washing the parts. It takes from thirty to forty-five minutes per day properly to wash the parts of a cream separator. This would aggregate in time eighteen to twenty working days (at ten hours per day) each calendar year. With the use of my washer, however, the same work is done in a very much less time.

Each cream separator, it will be seen, furnishes its own wash bowl. When it is ready to wash the separator the bowl is taken off and put in place with the remaining elements that constitute my invention. The various other parts of the separator to be washed are placed in the bowl, the disks being strung on the pin 37 of the trestle so as to keep them off the bottom of the bowl 38 during the washing act. All of the washable parts, as before intimated, are placed inside the milk separator bowl 38 and washed at the same time. The only power used in operating is hand power applied to the handle 34 to rotate the bowl on its axis. The washing is effected by a quick rotation or preferably a quick rocking motion on the axis of the bowl. Cold water is first used for about a half minute. This removes all of the loose milk and cream. The water is then drained out and one and one-half gallons of boiling water is substituted and the parts washed for about one minute. Then this is drained and the next operation is a fast spinning motion to dry the parts within the bowl.

I find from practical experience that the best results are produced by holding the rotation axis of the apparatus at an angle of fifty degrees and by placing the funnel to which the water is introduced so as to deliver in the center of the lid with the mouth of the funnel horizontal when the parts are in the position shown in Figure 1 which is the position they are put in when it is desired to introduce the wash waters. The location of the vent pipe 32 with respect to the funnel is also important so that as the wash water is introduced the air within the separator will escape without causing bubbling or spraying of the liquid contents of the bowl.

The half-circle rubber hose 22 underneath the lid is an important part of my invention and is provided to hold the parts to be washed from sliding around with the water.

The shaft 7 has one end turned to fit the bearing in the bottom of the cavity 2 and the other end to fit the hub of the spider.

After the separator parts and the separator bowl have been washed as above described the lid is removed and the bowl taken off the spider. The washed and dried parts may be left in the separator bowl until it is desired to re-assemble the milk separator—thus they need not be handled until it is desired to put them into use again.

It will be noted that the trestle 36 has one of its wires 49 curved to conform to the curvature of the crown 42 of the bottom of the bowl 38 so that the trestle will lie in the position indicated in Figure 1.

From the foregoing description, taken in connection with the accompanying drawings, it is thought the construction, operation, and advantages of my invention will be clear to those skilled in the art to which it relates.

What I claim is:

1. In a washer, a support having shaft bearings, the axes of which lie at an angle approximately fifty degrees to the horizontal, a shaft rotatable in said bearings, a spider having a hub secured on said shaft and receiving the bowl of a cream separator thereon, a flanged cover fitting over the mouth of the separator bowl and having a bowl sealing ring, toggle straps and levers secured to said spider and engaging said cover to hold the cover on the bowl and the bowl on the spider securely, a handle projecting from the top face of said cover by which the assemblage may be rotated or oscillated on the axis of said shaft, said cover having a central water hole and a funnel extending upwardly therefrom with its mouth edge held at an angle of approximately forty degrees to the face of the cover, an air vent tube carried by the cover and located adjacent the low side of the funnel, and a flexible U-shaped member mounted on the under side of the cover to project into the bowl.

2. In a washer, a support having shaft bearings, the axes of which lie at an angle approximately fifty degrees to the horizontal, a shaft rotatable in said bearings, a spider having a hub secured on said shaft and receiving the bowl of a cream separator thereon, a flanged cover fitting over the mouth of the separator bowl and having a bowl sealing ring, toggle straps and levers secured to said spider and engaging said cover to hold the cover on the bowl and the bowl on the spider securely, a handle projecting from the top face of said cover by which the assemblage may be rotated or oscillated on the axis of said shaft, said cover having a central water hole and a funnel extending upwardly therefrom with its mouth edge held at an angle of approximately forty degrees to the face of the cover, an air vent tube carried by the cover and located adjacent the lower side of the funnel, a flexible U-shaped member mounted on the under side of the cover to project into the bowl, and a trestle for mounting separator disks within the bowl.

3. In a washing machine, a fixed support held at an angle approximately fifty degrees to the horizontal, shaft bearings carried by said support, a shaft journalled in said bearings with its axis held at approximately fifty degrees to the horizontal, a spider having a hub with a set screw mounted on said shaft, said spider having a set of arms, straps secured to said arms, toggle levers pivoted to the free ends of said straps, other straps pivoted to said toggle levers and having hook ends, a separator bowl having a mouth flange and a discharge faucet, a cover having an annular flange overlying said mouth flange, said cover having a bead over which said hooks are held, said cover having an annular groove on its underside adjacent the bead, a gasket ring held in said annular groove, said cover having a central filling hole, a funnel secured over said hole and to said cover with its axis held at an angle of approximately fifty degrees to the face of the cover, and a vent tube secured to the cover between said funnel and the face of the cover, said cover having on its under side a pair of diametrically spaced lugs and a U-length of hose pipe having its ends fitted over said lugs and its bend projected into said bowl to adjacent the bottom of the bowl, substantially as specified.

4. In a washing machine, a fixed support held at an angle approximately fifty degrees to the horizontal, shaft bearings carried by said support, a shaft journalled in said bearings with its axis held at approximately fifty degrees to the horizontal, a spider having a hub with a set screw mounted on said shaft, said spider having a set of arms, straps secured to said arms, toggle levers pivoted to the free ends of said straps, other straps pivoted to said toggle levers and having hook ends, a separator bowl having a mouth flange and a discharge faucet, a cover having an annular flange overlying said mouth flange, said cover having a bead over which said hooks are held, said cover having an annular groove on its underside adjacent the bead, a gasket ring held in said annular groove, said cover having a central filling hole, a funnel secured over said hole and to said cover with its axis held at an angle of approximately fifty degrees to the face of the cover, and a vent tube secured to the cover between said funnel and the face of the cover, said cover having on its under side a pair of diametrically spaced lugs, and a U-length of hose pipe having its ends fitted over said lugs and its bend projected into said bowl to adjacent the bottom of the bowl, the bottom of said bowl being crowned inwardly, and a trestle composed of wires including substantially parallel portions and end portions, the end portions lying in planes normal to the substantially parallel portions, means for securing the end portions together to hold said substantially parallel portions separated from one another to provide means on which to string separator disks.

5. In a washing machine, a fixed support held at an angle approximately fifty degrees to the horizontal, shaft bearings carried by said support, a shaft journalled in said bearings with its axis held at approximately fifty degrees to the horizontal, a spider having a hub with a set screw mounted on said shaft, said spider having a set of arms, straps secured to said arms, toggle levers pivoted to the free ends of said straps, other straps pivoted to said toggle levers and having hook ends, a separator bowl having a mouth flange and a discharge faucet, a cover having an annular flange overlying said mouth flange, said cover having a bead over which said hooks are held, said cover having an annular groove on its underside adjacent the bead, a gasket ring held in said annular groove, said cover having a central filling hole, a funnel secured over said hole and to said cover with its axis held at an angle of approximately fifty degrees to the face of the cover, and a vent tube secured to the cover between said funnel and the face of the cover, said cover having on its under side a pair of diametrically spaced lugs, and a U-length of hose pipe having its ends fitted over said lugs and its bend projected into said bowl to adjacent the bottom of the bowl, the bottom of said bowl being crowned inwardly, and a trestle composed of wires including substantially parallel portions and end portions, the end portions lying in planes normal to the substantially parallel portions, means for securing the end portions together to hold said substantially parallel portions separated from one another to provide means on which to string separator disks, said trestle having one of its wires curved to fit the crown of the bowl bottom with which it engages.

STERLING WELLS.